United States Patent

Krutz et al.

[11] Patent Number: 5,826,190
[45] Date of Patent: Oct. 20, 1998

[54] EMERGENCY HANDOFF METHOD OF REDIRECTING CALLS IN A SATELLITE COMMUNICATION SYSTEM

[75] Inventors: Michael William Krutz, Chandler; Daniel Richard Tayloe, Poenix, both of Ariz.; Bradley B. Bakke, Elgin, Ill.

[73] Assignee: Motorola, Inc., Schaumburg, Ill.

[21] Appl. No.: 801,322

[22] Filed: Feb. 18, 1997

Related U.S. Application Data

[63] Continuation of Ser. No. 368,450, Jan. 4, 1994.

[51] Int. Cl.⁶ ............................... H04Q 7/38; H04B 7/185
[52] U.S. Cl. ..................... 455/428; 455/429; 455/437; 455/13.2
[58] Field of Search ................................ 455/13.2, 12.1, 455/13.1, 33.1, 33.2, 34.2, 57.1, 56.1, 422, 427, 428, 429, 436, 437, 438, 439

[56] References Cited

U.S. PATENT DOCUMENTS

| | | |
|---|---|---|
| 4,556,760 | 12/1985 | Goldman ........................... 455/56.1 X |
| 5,267,261 | 11/1993 | Blakeney, II et al. ............... 455/437 X |
| 5,379,446 | 1/1995 | Murase .................................. 455/33.2 |
| 5,394,561 | 2/1995 | Freeburg ............................ 455/13.2 X |
| 5,483,664 | 1/1996 | Moritz et al. ........................... 455/13.1 |
| 5,488,640 | 1/1996 | Redden et al. ..................... 455/13.2 X |
| 5,561,838 | 10/1996 | Chandros et al. ..................... 455/13.1 |
| 5,625,867 | 4/1997 | Rouffet et al. ......................... 455/13.1 |

Primary Examiner—Edward F. Urban
Assistant Examiner—Philip J. Sobutka
Attorney, Agent, or Firm—Harold C. McGurk

[57] ABSTRACT

An emergency handoff method (50) reroutes or redirects communications from one channel in a cell (105) to another channel in the same cell (105) or a different cell (107). Handoff is initiated by a subscriber unit (SU) (100) when the SU (100) determines that an emergency handoff is needed. Once a new channel is needed, the SU (100) chooses a new, available channel to transfer its communication. After selecting an available channel, the SU (100) acquires the available channel. The servicing satellite which is providing the available channel then makes the constellation of satellites reroute or redirect the call data or the communication packets across the new channel to the SU (100).

5 Claims, 3 Drawing Sheets

EMERGENCY HANDOFF METHOD OF REDIRECTING CALLS IN A SATELLITE COMMUNICATION SYSTEM

This application is a continuation of prior application Ser. No. 08/368,450, filed Jan. 4, 1994.

FIELD OF THE INVENTION

This invention relates generally to satellite cellular communications and, in particular, to an emergency handoff method of performing emergency handoff from one channel to another channel.

BACKGROUND OF THE INVENTION

A cellular communication system projects a number of cells onto the earth at diverse locations. A frequency spectrum is allocated in frequency, time, coding or a combination of these to the cells so that communications occurring in nearby cells use different channels to minimize the chances of interference. Communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results with no interference among the different communications.

In an urban environment, movement of a subscriber unit (e.g., a cellular phone) or a satellite can cause an abrupt change in the path loss characteristics, such as losing the signal from the servicing satellite. If a second satellite is in view of the user, the sudden loss of the first satellite will not allow the user to handoff the call to the second satellite. Thus, the call will be dropped or lost.

This abrupt loss of the communication signal can also occur from cell to cell on the same satellite. The fall-off rate of the inner cells of a satellite are such that the subscriber unit may not react fast enough to perform a normal handoff before the path from the original cell degrades to uselessness. Communications can also be lost for some period of time due to environmental conditions. After this period of time, changes in the spatial relationship between the subscriber and the system may make it impossible for the subscriber to perform a normal handoff.

Accordingly, there is a significant need for a emergency handoff method which permits each of the Subscriber Units (SUs) to determine when a new channel is necessary and to select a new channel that will receive its communications.

DESCRIPTION OF THE PREFERRED EMBODIMENTS

The present invention has utility in redirecting communications from one channel in a cell to another channel in the same cell or a different cell in accordance with a preferred embodiment of the invention. Handoff is initiated by a subscriber unit (SU) based on local conditions. Once emergency handoff is needed, the SU identifies and acquires a new channel and the servicing satellite reroutes communication packets to the SU over the new channel so that the call is uninterrupted.

A "satellite" means a man-made object or vehicle intended to orbit a celestial body such as the earth. The term "satellite" is intended to include both geostationary and orbiting satellites and/or combinations thereof including low-earth orbiting (LEO) satellites. The word "earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell" and "antenna pattern" are not intended to be limited to any particular mode of generation and include those created by either terrestrial or satellite cellular communication systems and/or combinations thereof.

Figure 1:
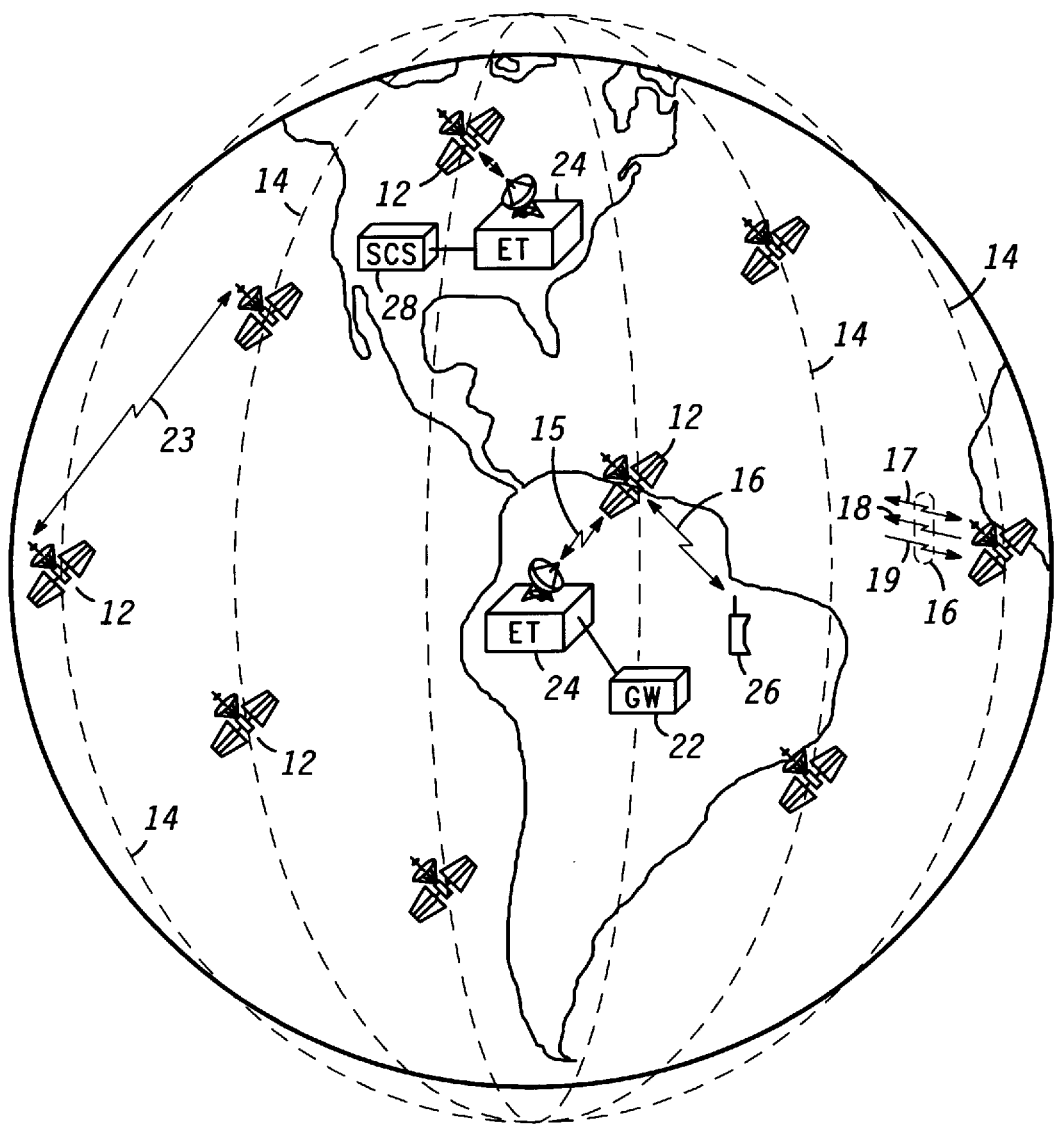
FIG. 1 depicts a highly simplified diagram of a satellite-based communication system of which the present invention may form a portion thereof.

FIG. 1 illustrates a highly simplified diagram of satellite-based communication system 10, dispersed over and surrounding earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or SUs 26 for a period of approximately nine minutes.

Satellites 12 communicate with terrestrial stations which may include some number of radio communication subscriber units (SUs) 26 and earth terminals (ETs) 24 connected to system control segment (SCS) 28. SCS 28 may be a base station, for example. ETs 24 may also be connected to gateways (GWs) 22 which provide access to a public switched telephone network (PSTN) or other communications facilities. Only one each of GWs 22, SCSs 28 and SUs 26 are shown in FIG. 1 for clarity and ease of understanding. ETs 24 may be co-located with or separate from SCS 28 or GW 22. ETs 24 associated with SCSs 28 receive data describing status of satellites 12 and GWs 22 and relay packets of control information. ETs 24 associated with GWs 22 primarily receive and relay packets relating to calls in progress from/to SUs 26 and satellites 12.

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12. Ordinarily, SUs 26 need not perform any control functions for communication system 10.

Communication system 10 may accommodate any number, potentially in the millions, of SUs 26. In the preferred embodiments of the present invention, SUs 26 communicate with nearby satellites 12 via subscriber links 16. Links 16 encompass a limited portion of the electromagnetic spectrum that is divided into numerous channels. Links 16 are preferably combinations of L-Band and/or K-Band frequency channels and may encompass Frequency Division Multiple Access (FDMA) and/or Time Division Multiple Access (TDMA) and/or Code Division Multiple Access (CDMA) communications or combinations thereof. At a minimum, satellite 12 regularly transmits over one or more broadcast channels 18. SUs 26 synchronize to broadcast channels 18 and monitor broadcast channels 18 to detect data messages which may be addressed to them. SUs 26 may transmit messages to satellites 12 over one or more acquisition channels 19. Broadcast channels 18 and acquisition channels 19 are not dedicated to any one SU 26 but are shared by all SUs 26 currently within view of a satellite 12.

On the other hand, traffic channels 17 are two-way channels that are assigned to particular SUs 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from a SU 26 located at any point on or near the surface of the earth may be routed through the constellation of satellites 12 to within range of substantially any other point on the surface of the earth. A communication may be routed down to a SU 26 on or near the surface of the earth from a satellite 12 using subscriber link 16. Alternatively, a communication may be routed down to or up from any of many ETs 24, of which FIG. 1 shows only two, through earth links 15. ETs 24 are usually distributed over the surface of the earth in accordance with geo-political boundaries. In the preferred embodiments, each satellite 12 may communicate with up to four ETs 24 and over a thousand SUs 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communication systems, such as the PSTN, may access communication system 10 through GWs 22.

With the example constellation of sixty-six satellites 12, at least one of satellites 12 is within view of each point on the earth's surface at all times, resulting in full coverage of the earth's surface. Any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and SU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
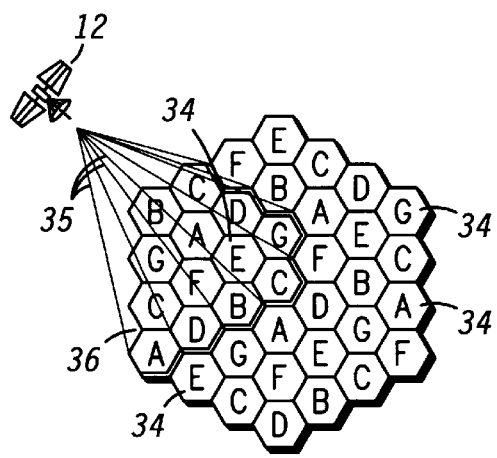
FIG. 2 shows a typical layout diagram of a cellular pattern projected by a satellite onto earth.

FIG. 2 shows a typical layout diagram of a cellular antenna pattern projected by satellites 12 onto the surface of the earth. Each satellite 12 includes an array (not shown) of directional antennas. Each array projects numerous discrete antenna beams 35 or broadcast channel antenna patterns onto the earth's surface at numerous diverse angles. FIG. 2 shows a diagram of a resulting pattern of cells 34 that satellites 12 form on the surface of the earth. A footprint region 36, which is bounded by a double line in FIG. 2, results from the antenna beams 35 produced by an antenna array of a single satellite 12. The cells 34 which reside outside of region 36 are produced by antenna arrays from other satellites 12.

Antenna patterns 35 are shown as hexagons for convenience only. Those of skill in the art understand that antenna patterns 35 may be other shapes. For example, in the case where the antenna patterns are transmitted from satellites, some antenna patterns 35 may be more elliptical in shape depending on the angle incident to the surface of the earth. The particular shape of the antenna pattern is not important for the present invention.

Although not shown in FIG. 2, antenna patterns 35 may overlap. Those of skill in the art will understand that antenna patterns generally represent regions where a signal level (for example, of the broadcast channel) associated with a cell is greater than some predetermined level, and outside that region, the signal level is less than that predetermined level.

As discussed previously, satellite 12 continuously transmits over one or more broadcast channels 18. SUs 26 synchronize to broadcast channels 18 and monitor broadcast channels 18. Preferably, a SU continually monitors the broadcast channel of the cell in which it is located. Broadcast channels 18 are not dedicated to any one SU but are shared by all SUs currently within view of the satellite.

In the preferred embodiment, broadcast channel antenna patterns move over the surface of the earth while SUs remain relatively stationary. In the preferred embodiment, this motion is caused by the motion of the satellites which transmit the broadcast channels. Each antenna pattern 35 or cell 34 is approximately 500–600 miles in diameter and moves across the surface of the earth at a rate of approximately 110 miles in thirty seconds. The motion of the broadcast channel antenna patterns from the equator to the poles creates overlap of antenna patterns between adjacent satellites. As overlap occurs, broadcast channels are desirably turned off to prevent interference between overlapping antenna patterns.

Assignments of traffic channels 17 (FIG. 1) are valid only for as long as a SU remains within the cell. Generally, based on the movement of the satellites, this period is approximately 50 seconds. New traffic channel assignments must be established every period. Because of the fast moving antenna patterns, it is desirable for SUs to monitor the broadcast channels of adjacent cells that are candidates for emergency handoff.

FIG. 2 illustrates an assignment of channel sets to cells 34 in accordance with a division of the spectrum into seven discrete channel sets. The precise number of channel sets into which the spectrum used by satellites 12 is divided is not important to the present invention. FIG. 2 references the seven discrete channel sets through the use of the characters "A", "B", "C", "D", "E", "F", and "G". Those skilled in the art will appreciate that a different number of channel sets, for example twelve, may be used and that, if a different number is used the resulting assignment of channel sets to cells 34 will differ from the assignment pattern depicted in FIG. 2. Likewise, those skilled in the art will appreciate that each channel set may include one channel or any number of orthogonal channels therein. As illustrated in FIG. 2, the assignment of channel sets to cells 34 allows the limited spectrum to be reused in geographically spaced apart cells 34. In other words, non-orthogonal channel sets simultaneously carry communications without interference because the cells 34 where the non-orthogonal channel sets are used are spaced apart from one another and do not overlap. Moreover, each SU 26 is capable of operating with any of the discrete channel sets, and the particular channel set used at any particular time by any particular SU 26 is controlled by communication system 10.

Typically, cellular communication systems use various methods to allocate the limited electromagnetic spectrum available for each cell. In Frequency Division Multiplexing (FDM) or Frequency Division Multiple Access (FDMA) systems, specified sub-bands of frequency are allocated from the communication resource (i.e. the limited electromagnetic spectrum allocated for use). In a FDM/FDMA cellular communication system, each cell is assigned to one of these groups of frequencies so as to not interfere with adjacent or nearby cells. For example, in a seven frequency reuse scheme as shown in FIG. 2, the frequency assignments are fixed to the seven discrete channel sets noted as characters "A", "B", "C", "D", "E", "F", and "G" as previously described. The seven frequency reuse arrangement of cells helps prevent interference between cells with identical frequency assignments (i.e. co-channel cells) by separating these cells by at least two cells of different frequency assignments although it is more desirable to have only one cell separating co-channel cells.

Cellular communication systems also use Time Division Multiplexing (TDM) or Time Division Multiple Access (TDMA) where there are periodically recurring time slots during which message information of a particular user is transmitted/received. The users are assigned to particular time slots controlled by a master controller synchronized by a master clock. In reference to FIG. 2, each discrete channel set noted as characters "A", "B", "C", "D", "E", "F", and "G" can be assigned one time slot. Each cell can use the same frequency channel or channel set without interference because the users in each cell only receive or transmit information during their assigned time slot. Each time slot can contain one message packet (i.e., single message time slots) or can contain multiple message packets (i.e., multiple sub-time slots each containing a single message).

In some applications, it is desirable to use a combination of FDMA and TDMA. For example, instead of using the same frequency channels or channel sets for a network and allocating different time slots to different cells, it is possible to rotate frequencies among the cells and assign the same or different time slot per cell. With FDMA and TDMA, some frequencies or time slots are usually reserved for access signaling and/or control, and are not ordinarily available for conventional conversations and/or user data transfer (i.e., for access protocol). Some channels and/or time slots of the combination FDMA/TDMA system of a preferred embodiment of the present invention are also desirably reserved for the same purpose. FDMA and TDMA communication techniques and combinations thereof are well known to those of skill in the art.

The communication resource, (i.e. limited electromagnetic spectrum) can also be partitioned Code Division Multiplexing (CDM) or Code Division Multiple Access (CDMA). CDMA is a spread spectrum technique in which specified members of a set of orthogonal or nearly orthogonal spread spectrum codes are allocated, each using the full channel bandwidth. Two common spread spectrum techniques are direct-sequence and frequency hopping. These communication techniques are well known in the art.

Other techniques in the art for allocation of the communication resource include Space Diversity (SD) and Polarization Diversity (PD). In an SD system, spot beam antennas can be used to separate radio signals by pointing in different directions. This also allows for reuse of the same frequency band. In a PD communication system, orthogonal polarizations are used to separate signals also allowing for reuse of the same frequency band. These communication techniques are also well known in the art.

While the specific communication technique (i.e. method of allocating the communication resource) is not important for the present invention, those of skill in the art will understand that any one or combination of the above described communication techniques can be used in the present invention.

SUs initially determine with which cell to communicate with based on the signal level or signal quality of the broadcast channel received at the SU. For example, a SU located within a center region of a cell would most likely choose to communicate within the cell associated with this cell because the broadcast channel signal level of an antenna pattern is generally the greatest in the center region. If a subscriber unit is located within the region where two antenna patterns or cells overlap, the SU may choose either cell to communicate with because the broadcast channel signal levels are generally similar.

Figure 3:
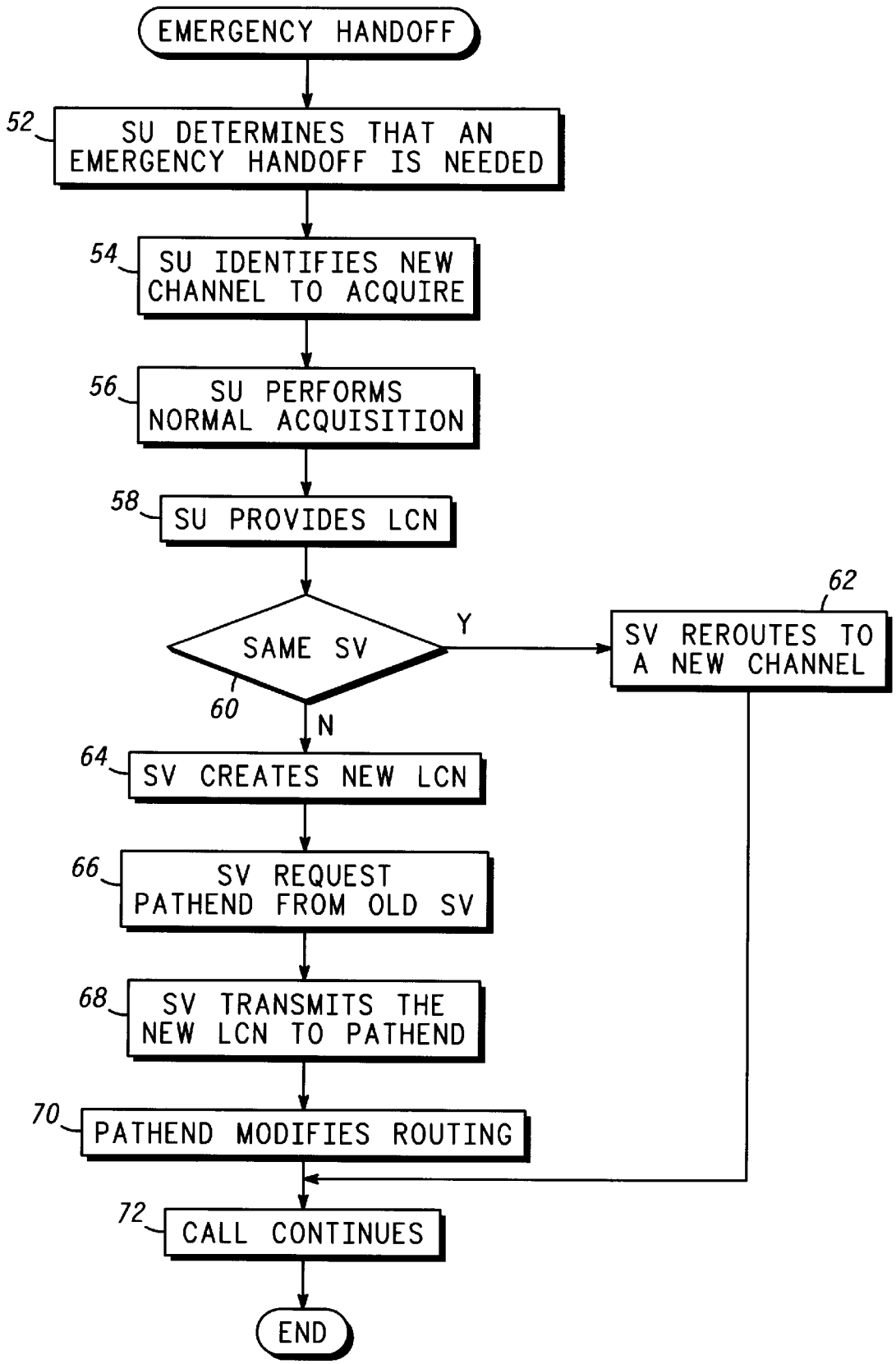
FIG. 3 shows a flowchart of an emergency handoff method of redirecting communications from one channel in a cell to another channel in the same cell or a different cell in accordance with a preferred embodiment of the invention.

FIG. 3 shows a flowchart of an emergency handoff method 50 of redirecting communications from one channel in a cell to another channel in the same cell or a different cell in accordance with a preferred embodiment of the invention. According to FIG. 3, a SU (subscriber unit) detects in step 52 whether an emergency handoff is needed. An emergency handoff is needed, for example, when there is a loss of the signal or very poor signal quality. The loss of the signal may be indicated if there is a disruption in the signal for a period of time which is greater than a predetermined amount of time. The predetermined amount of time is set based on a particular satellite communication system. For example, the predetermined amount of time may be a function of time a SU is communicating in the current cell. For the IRIDIUM® Communication System, the time is preferably six seconds. Poor signal quality may also be indicated by the SU receiving only a few of the communication packets sent from the satellite. There may be other techniques for determining that a new channel is needed which is obvious to those of ordinary skill in the art.

Once the SU determines that an emergency handoff is needed in step 52, the SU identifies in step 54 a new channel to acquire from a list of available cells provided by the servicing satellite. The available cells may be provided in a handoff candidate list or another list. The handoff candidate list comprises channel identification (time and frequency) for the broadcast channels of the cells that are the most likely candidate into which the SU can be transferred.

The handoff candidate list includes only cells that are currently available. In particular, cells will not be included if they are about to be shut down, even if the current geometry would seem to make them a good candidate for emergency handoffs. When the satellites approach either of the poles, candidate cells of the satellites may begin to overlap. This means that one of the satellites will have to turn off its cells and corresponding channels so that no interference will be caused between two active, overlapping cells. Moreover, the calls will be transferred from the satellites whose cells are being turned off to the satellite whose cells remain turned on.

The handoff candidate list is generated in advance by satellite control station (SCS) 28 (FIG. 1). SCS 28 knows what channels are available for the SU. SCS 28 transfers the handoff candidate list for each cell served by a satellite to each of the satellites which in turn transmits the appropriate list to the SUs in each of its cells. The SUs update their candidate list by observing differences between the broadcast channels and cells identified in the handoff candidate updated messages and the broadcast channels and cells transmitted in previously provided candidates lists. Whether or not a cell in the current list remains valid is indicated by the current satellite in the candidate update messages.

After the SU selects a new channel in step 54, the SU acquires in step 56 the new channel. This channel may be a channel (i) in the same cell of the same satellite, (ii) in a different cell of the same satellite, or (iii) in a different cell of another satellite. Next, the SU provides in step 58 the satellite currently servicing the SU with a logical channel number (LCN). The LCN comprises a unique satellite ID number and a random number. The unique satellite ID number is given to each satellite in the constellation. The LCN is assigned by the satellite to the SU when a call is first initiated and is updated upon every satellite to satellite handoff. In the preferred embodiment, the LCN stays the same for all emergency handoffs within the same satellite. Thus, when a call is first being set-up by a satellite, the satellite gives the SU a LCN which includes its unique satellite ID number. From the unique satellite ID number provided in the LCN, the servicing satellite can determine in step 60 whether it was the satellite handling the call before the SU acquired a new channel.

If the servicing satellite determines in step 60 that it was the satellite handling the call before the SU acquired a new channel, the servicing satellite reroutes in step 62 the call to the new channel and the call continues in step 72. Steps 62 and 72 are performed when the new channel acquired by the SU is in the same cell or a different cell of the same satellite which was handling the call before the SU acquired a new channel.

Otherwise, the servicing satellite determines in step 60 that it was not the satellite handling the call before the SU acquired a new channel. In other words, the SU is now being serviced by a different satellite. Emergency handoff method 50 next creates in step 64 a new LCN. The new LCN will include the unique satellite ID number of the satellite currently servicing the SU. The LCN will be transmitted back to the SU. The satellite currently servicing the SU will then use the old LCN from the SU to request in step 66 pathends from the old satellite which used to service the SU. A pathend is a satellite or a gateway that connects the caller at the other end of the call to the constellation. Incidentally, the pathend could be the same satellite currently servicing both of the SUs.

Once the servicing satellite obtains the pathend from the satellite that used to service the SU in step 66, the servicing satellite transmits in step 68 the new LCN (created in step 64) to the end gateway or satellite identified by the pathend. The pathend (satellite or gateway) starts in step 70 to route the call to the servicing satellite and the call continues in step 72.

Figure 4:
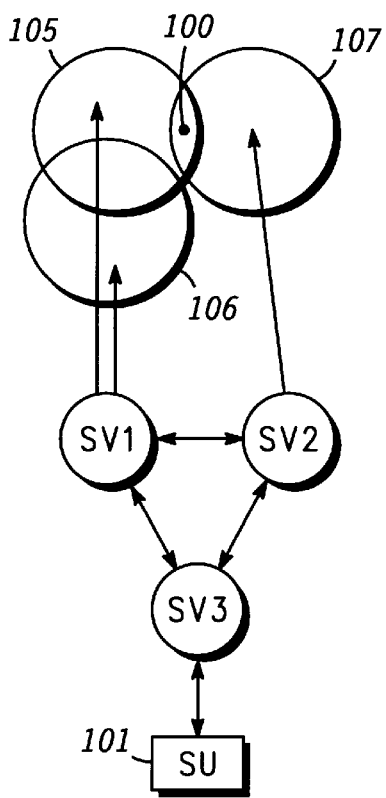
FIG. 4 shows cells and satellites to be used as an example for illustrating the emergency handoff method.

FIG. 4 shows cells and satellites to be used as an example for illustrating the emergency handoff method. As shown in FIG. 4, SU 100 is communicating with SU 101 through a constellation of satellites SV1, SV2 and SV3. SV3 is separately coupled to SV1 and SV2. Satellite SV1 is servicing SU 100, while satellite SV3 is servicing SU 101. Cells 105 and 106 are being projected by satellite SV1, and cell 107 is being projected by satellite SV2.

Suppose SU 100 detects, in step 52 of the method shown in FIG. 3, a loss of the signal indicating that an emergency handoff is needed. According to FIG. 3, SU 100 next identifies in step 54 an available channel in cell 105, 106 or 107. Since SU 100 can select in this example from channels in cell 105, 106 or 107, each will be discussed separately.

Suppose that SU 100 chooses a new, available channel in cell 105. SU 100 next acquires in step 56 the new channel and provides in step 58 its logical channel number (LCN) to SV1. SV1 was servicing SU 100 before SU 100 acquired a new channel. SV1 then determines in step 60 whether it was servicing SU 100 before SU 100 acquired a new channel. Since SV1 was servicing SU 100 before SU 100 acquired a new channel, SV1 reroutes or redirects in step 62 the call data or communication packets to the new channel in the same cell 105. The call continues in step 72 between SU 100 and 101.

Suppose SU 100 chooses a new, available channel in cell 106. SU 100 next acquires in step 56 the new channel and provides in step 58 its LCN to SV1. SV1, as indicated above, was servicing SU 100 before SU 100 acquired a new channel. As in the previous example, SV1 determines in step 60 that it was servicing SU 100 before SU 100 acquired a new channel; and thus, SV1 reroutes or redirects in step 62 the call data or communication packets to the new channel in cell 106. The call will continue in step 72 between SU 100 and 101.

Suppose SU 100 chooses a new, available channel in cell 107. As shown in FIG. 4, cell 107 is being projected by SV2 rather than SV1. According to method 50 shown in FIG. 3, SU 100 acquires in step 56 the new channel and provides in step 58 the old LCN to SV2. SV1 does not receive the LCN because SU 100 and SV2 are communicating with each other over the new channel.

In step 60 of method 50, SV2 determines whether it was previously servicing SU 100 based upon the LCN. The LCN contains the satellite ID of SV1, rather than SV2, because SV1 was previously servicing SU 100 before SU 100 acquired the new channel. Next, SV2 creates in step 64 a new LCN for SU 100 based upon its own unique satellite ID number and provides it to SU 100. In step 66, SV2 requests from SV1 what the pathend of the call is. The pathend in the example shown in FIG. 4 is SV3 because SV3 is servicing SU 101. The pathend could also be a gateway if the other end of the call terminated with a PSTN user instead of another SU.

According to method 50, SV2 transmits to pathend SV3 the new LCN in step 68. Pathend SV3 then modifies its routing in step 70 to send call data or communication packets to SV2 instead of SV1. The call continues uninterrupted between SU 100 and 101 in step 72.

It will be appreciated by those skilled in the art that the present invention reroutes or redirects communications from one channel in a cell to another channel in the same cell or a different cell. The emergency handoff method is applicable to both audio and data calls. An advantage of the present invention is an emergency handoff method which does not unduly complicate the system hardware. Another advantage of the present invention is to handoff a call from channel to channel without interrupting service. It is also an advantage of the present invention that the SU establishes the need for emergency handoff and the selects an available channel. Yet another advantage of the present invention is to allow various classes of SUs to use different methods for determining the need for emergency handoff. A further advantage of the present invention is to allow emergency handoff when communications to the original satellite is not possible due to loss of signal, interference, etc.

What is claimed is:

1. A method of handing-off a call from a current channel to one of a plurality of available channels in a satellite cellular communication system, the call being between a first subscriber unit (SU) and a second SU, the current channel being projected onto earth by a first satellite, the available channels being projected onto earth by a second satellite, a third satellite servicing the second SU, the method comprising the steps of:
    a) the first SU determining that an emergency handoff is needed, wherein synchronization is not lost;
    b) the first SU acquiring an available channel from the available channels and providing a logical channel number to the second satellite;
    c) the second satellite creating a new logical channel number;
    d) the second satellite receiving a pathend from the first satellite;
    e) the second satellite transmitting the new logical channel number to the pathend, the pathend being the third satellite;
    f) the third satellite rerouting the call from the first satellite to the second satellite; and
    g) the third satellite rerouting the call from the first satellite to the second satellite so that the second satellite can redirect the call to the available channel.

2. A method as recited in claim 1, wherein step (c) further comprises the step of the second satellite transmitting the new logical channel number to the first SU.

3. A method of handing-off a call from a current channel to one of a plurality of available channels in a satellite cellular communication system, the call being between a first subscriber unit (SU) and a second SU, the current channel being projected onto earth by a first satellite, the available channels being projected onto earth by a second satellite, a third satellite servicing the second SU, the method comprising the steps of:
    (a) the first SU determining that an emergency handoff is needed, wherein synchronization is not lost;
    (b) the first SU identifying an available cell from a list of available cells;
    (c) the first SU acquiring an available channel from the available cell;
    (d) the second satellite creating a new logical channel number;
    (e) the second satellite receiving a pathend from the first satellite;
    (f) the second satellite transmitting the new logical channel number to the pathend, the pathend being the third satellite;
    (g) the third satellite rerouting the call from the first satellite to the second satellite; and
    (h) the second satellite redirecting the call to the available channel.

4. A method of handing-off a call from a current channel to one of a plurality of available channels in a satellite cellular communication system, the call being between a first subscriber unit (SU) and a second SU, the current channel being projected onto earth by a first satellite, the available channels being projected onto earth by the first and a second satellite, a third satellite servicing the second SU, the method comprising the steps of:
    (a) the first SU determining that an emergency handoff is needed, wherein synchronization is not lost;
    (b) the first SU identifying an available cell from a list of available cells;
    (c) the first SU acquiring an available channel from the available cell;
    (d) the first SU providing a logical channel number to one of the first and second satellites;
    (e) the first satellite rerouting the call to the available channel if the logical channel number matches a logical channel number of the first satellite;
    (f) the third satellite rerouting the call from the first satellite to the second satellite if the logical channel number does not match a logical channel of the second satellite; and
    (g) the second satellite redirecting the call to the available channel if the logical channel number does not match the logical channel of the second satellite.

5. A method of handing-off a call from a current channel to one of a plurality of available channels in a satellite cellular communication system, the call being between a first subscriber unit (SU) and a second SU, the current channel being projected onto earth by a first satellite, the available channels being projected onto earth by a second satellite, the second satellite servicing the second SU, the method comprising the steps of:

(a) the first SU determining that an emergency handoff is needed, wherein synchronization is not lost;

(b) the first SU acquiring an available channel from the available channels;

(c) the second satellite determining whether it handled the call before the first SU acquired the available channel;

(d) the second satellite requesting and receiving a pathend from the first satellite;

(e) the second satellite determining that the pathend is the second satellite; and (f) the second satellite rerouting the call to the available channel.

* * * * *

UNITED STATES PATENT AND TRADEMARK OFFICE
CERTIFICATE OF CORRECTION

| | | |
|---|---|---|
| PATENT NO. | : 5,826,190 | Page 1 of 1 |
| APPLICATION NO. | : 08/801322 | |
| DATED | : October 20, 1998 | |
| INVENTOR(S) | : Krutz et al. | |

It is certified that error appears in the above-identified patent and that said Letters Patent is hereby corrected as shown below:

Title Page --

Item [63] Please correct the filing date of Continuation of Ser. No. 368,450 from Jan. 4, 1994 to Jan. 4, 1995.

[63] Please change "1994" to --1995--

Signed and Sealed this

First Day of July, 2008

JON W. DUDAS
*Director of the United States Patent and Trademark Office*